United States Patent [19]

Nakahama et al.

[11] 4,369,086
[45] Jan. 18, 1983

[54] BEAD SUPPLY APPARATUS

[75] Inventors: Kozo Nakahama, Kobe; Kazuo Kadomaru, Akashi; Masuzo Okaniwa, Sakai, all of Japan

[73] Assignee: Sumitomo Rubber Industries, Ltd., Hyogo, Japan

[21] Appl. No.: 229,843

[22] Filed: Jan. 30, 1981

[30] Foreign Application Priority Data

Jan. 31, 1980 [JP] Japan .................... 55-11312

[51] Int. Cl.³ .......................... B29H 17/22
[52] U.S. Cl. .................... 156/403; 156/131; 156/398
[58] Field of Search ............ 156/126, 131, 132, 398, 156/403

[56] References Cited

U.S. PATENT DOCUMENTS

| 3,082,811 | 3/1963 | Borglin et al. | 156/403 |
| 3,112,237 | 11/1963 | Borglin et al. | 156/131 X |
| 3,224,921 | 12/1965 | Frazier | 156/131 |
| 3,915,788 | 10/1975 | Hirata et al. | 156/126 X |
| 3,982,989 | 9/1976 | Badenkov et al. | 156/403 |
| 4,190,482 | 2/1980 | Yabe | 156/403 |

Primary Examiner—Edward C. Kimlin
Assistant Examiner—Lois E. Boland
Attorney, Agent, or Firm—Birch, Stewart, Kolasch & Birch

[57] ABSTRACT

A bead manipulator subassembly for a bead supply apparatus for setting beads, at given intervals, at both side-portions of a green tire inner layer formed on a tire molding former. A movable bead setter is disposed between said tire molding former and a bead stocker is provided with a bead retaining means for concentrically collecting and retaining two beads from a bead stocker. A posture controlling means for controlling the posture of the retaining means is provided so that said two beads may align with the center of the former. A motion controlling means for controlling the motion of the bead setter can be added so that said two beads may align with the center of the former.

11 Claims, 7 Drawing Figures

BEAD SUPPLY APPARATUS

BACKGROUND AND SUMMARY OF THE INVENTION

The present invention relates to a novel tire bead supply apparatus for a tire building line, and more particularly to the building of what is called a "green tire".

Generally, a tire building line has a tire building former of generally cylindrical construction whose cylindrical diameter can be selectively expanded or contracted. Rubberized cloth is affixed to the diameter-expanded former to form a cylindrical tire inner layer, thereafter, a ring shaped tire bead, generally made of stranded wire, is set at each of the two ends of the tire inner layer by a bead setter apparatus. Next, such things as a tire outer layer are affixed upon the tire inner layer to complete the building operation of an open-ended, barrel-shaped "green tire". Then, the diameter of the former is contracted to permit removal of the green tire from the former. In a later operation the green tire is cured and given its final, familiar tire shape and tread in a mold under heat and pressure.

This invention relates to the way beads are provided and set at the two ends of the green tire. In one type of conventional bead setter apparatus, the bead setter is in two parts, one part on each side of the former and each capable of holding a bead, the parts also are capable of free axial motion with the center of each bead ring being maintained in alignment with, and the plane of the bead ring being maintained normal to, a central shaft of the former. Generally, the former's central shaft is horizontal and supported at one end while free at the other so that the completed green tire can be slipped off the diameter-contracted former at its free end (See FIG. 1). It is common to call the free end side the "outer" side of the former and the other side the "inner" side of the former. Prior to the green tire building operation, a worker takes two beads from a bead supply peg near the former and engages one bead with a ring-shaped bead holding device ("bead ring") on the outer bead setter and extends the other bead over the former (while the former's diameter is contracted) to engage it with the bead ring of the inner bead setter. Thereafter, he steps on a pedal switch or the like to expand the former's diameter into a smooth drum shape so that the rubber-coated cloth can be affixed to the former's drum-like exterior.

Next the worker steps on a pedal switch or the like causing the inner and outer bead setters to each move towards each other in the axial direction and also towards the centrally located former. This motion of the bead setters towards the respective inner and outer ends of the former brings their respective inner and outer bead rings to positions where the bead rings place their respective inner and outer beads on the drum-shaped rubberized cloth affixed to the former, at places just centrally inwards from the inner and outer ends of the cloth. This leaves a collar-like strip of rubberized cloth beyond the bead at each of the inner and outer ends. Each collar-like strip is next snapped into place up and over its respective bead, usually by an appropriately shaped device, often called a "finger". This completes the bead setting operation, the bead at each end is now snug in the collar fold at that end.

Thereafter, the worker steps on a pedal switch or the like manually and returns the two parts of the bead setter to their original positions away from the former to continue the green tire building operation. When the green tire building operation has been completed, the pedal switch or the like is pedalled to reduce the diameter of the former and the green tire is pulled manually off the former at its free (outer) end.

In the above-described conventional tire molding operation because the amount of the rubber-coated cloth that becomes part of the collar may vary due to differences in rigidity in the rubberized cloth at spliced places (the rubberized cloth is often cut off to a particular width at a particular angle by a bias cutter and the cut end faces spliced together), differences in rubber viscosity, etc. But if the bead position and the amount of rubberized cloth folded up over the bead are not stable, tire size and quality becomes unstable. Also, with the two-part bead setter, prior to the bead-setting operation the worker is burdened with having to manually extend the inner bead over the reduced former to engage it with the inner part's bead ring. Additionally, the worker has to manually pull the completed green tire off the former every time and it is difficult to pull off the green tire keeping its axis parallel to the former's central shaft. Thus, during manual removal the edge of the diameter-reduced former may scratch and damage the green tire's bead portion, affecting its quality.

The present invention is provided to remove such conventional problems. A movable bead setter is disposed between a tire building former and a special automatic bead stocker. The setter is provided with a bead retaining means for concentrically collecting and retaining two beads from the bead stocker, a posture controlling means for controlling the work posture of the retaining means so that the centers and planes of the two beads may be properly aligned with the central shaft of the former, and a translation means or motion controlling means for controlling the motion of the bead setter so that the two beads may also be precisely aligned on opposite sides of the center plane of the former to reduce variation in the bead setting position and amount of the rubberized cloth folded over the beads stabilizing quality and reducing the worker's assembly burden. The form of the invention easily permits addition of a tire retriever means for automatically grasping and removing the completed green tire on the former to reduce the worker's burden and eliminate scratches of the green tire caused by manual retrieval.

BRIEF DESCRIPTION OF THE DRAWINGS

The embodiments of the present invention will be described hereinafter in detail with reference to accompanied drawings in which.

DETAILED DESCRIPTION OF THE INVENTION

Figure 1:
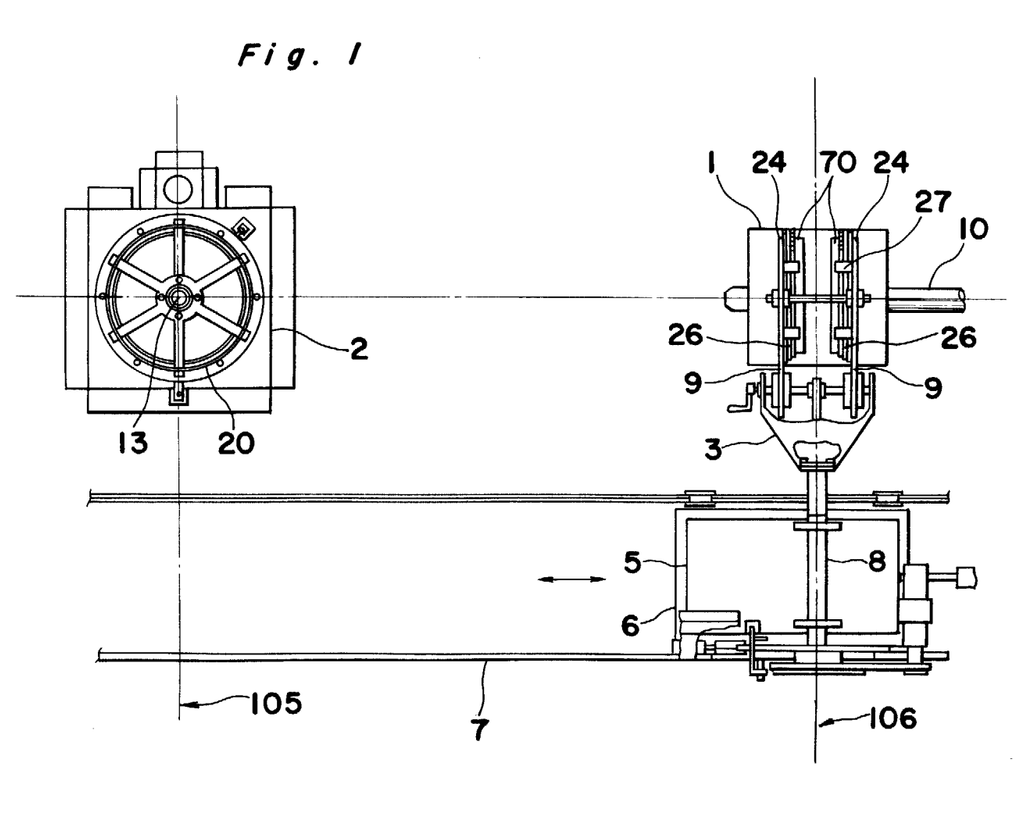
FIG. 1 is a schematic plan view showing the essential portions of the entire apparatus.
Figure 2:
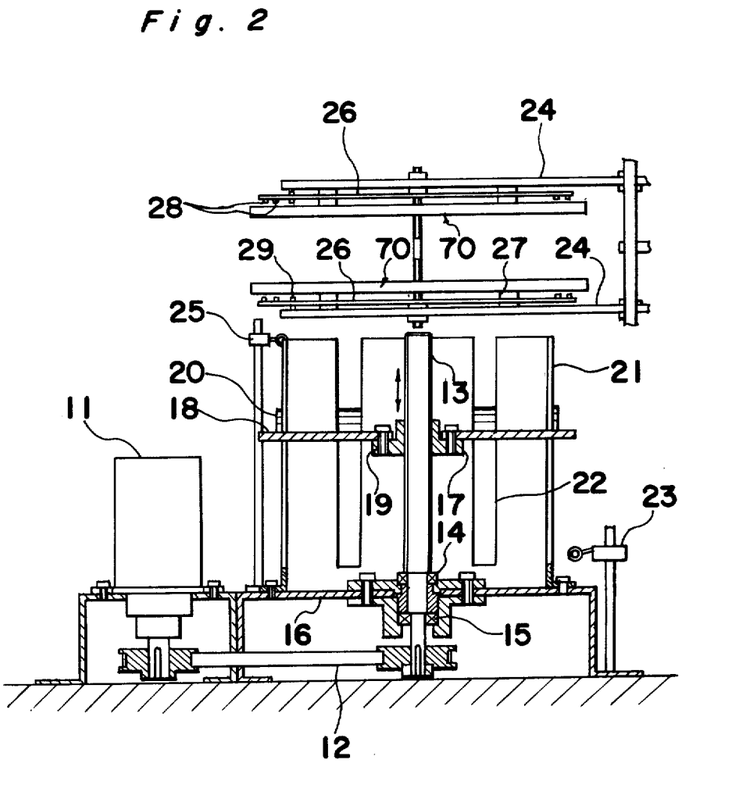
FIG. 2 is a side sectional view of a bead supply apparatus.

As shown in FIGS. 1 and 2 a bead stocker 2 having a driving source 11 is loaded with beads 20 which it can supply one by one in mutually parallel and concentric relation to opposed bead retainers 26 of a bead setter 3 through the operative cooperation with a limit switch 23 of the bead setter 3. The bead setter 3, FIGS. 1–7, has a mechanism for retaining two of the beads 20, one by one with their planes mutually parallel and the bead centers lying on a common imaginary axis running perpendicular to the planes of the beads, a mechanism for adjusting the spacing between the beads, a mechanism for selectively concentrically aligning the imaginary common axis through the bead centers with a central shaft 10 of a green tire former 1 and a central shaft or screw 13 of the bead stocker 2. Bead setter 3 also has a mechanism for moving retained aligned beads 20 to and along the shaft 10, and a mechanism for aligning the middle of the plane between the beads with a midplane 62 of the former 1 (See FIG. 3) equidistant from the ends of the former 1 and perpendicular to shaft 10, to place two beads 20 in mutually spaced parallel relation on rubberized cloth (not shown) pasted on former 1, the beads being positioned at grooves 9 of former 1. Bead setter 3's mechanism for moving can permit it to withdraw from the former 1 (shunt away) and retrieve the completed green tire (not shown) from former 1 after the green tire building operation.

To simplify the bead pickup and setting and green tire retrieving motion of bead setter 3, there is an arrangement of the former 1, the setter 3 and the bead stocker 2 as follows. The receiving plate 18 of bead stocker 2, shaft 10 of the former 1, rotary shaft 8 of the setter 3, and rail 7 are all horizontally mounted parallel to the floor face. The central screw 13 of stocker 2 is disposed vertical to the floor to perpendicularly intersect an imaginary extension of the axis of former shaft 10. Bead setter 3's rotary shaft 8 is mounted in a table lifter portion 5 and shaft 8's axis is oriented to perpendicularly intersect the axis of shaft 10 when raised to the height of shaft 10 (or intersect the imaginary extension of shaft 10's axis).

The rail 7 is installed along the floor parallel to the axis of shaft 10. Thus rotary shaft 8 is caused, when at the same height, to be normally perpendicular to the central axis of the shaft 10 or its extension even if shaft 8 is moved away from former 1 by a truck portion 6 mounted on rails 7. At the same time, the normal-to-rail 7 component of the projected-on-the-floor distance between the table lifter portion 5 either the shaft 10 of former 1 or screw 13 of bead stocker 2 are caused to become constant even when table lifter 5 moves along rail 7.

Also, former 1 is an expanding former expanding and contracting being provided in a convenient conventional manner. To correctly and positively perform the setting operation of the beads on the rubberized cloth (not shown) affixed to former 1, grooves 9 are provided at an equal distance from the former's central plane 62 (See FIG. 3) of former 1. Two bead retaining pincers 97, each pincer composed of two bead retaining claws 26 are provided in spaced parallel relation, each claw 26 mounted resiliently on a respective arm body 24 by a suitable number of supporting resilient supports 27, such as spring plungers in pairs as shown. The two pincers 97 are at equal and opposite intervals from the center of the rotary shaft 8, each of the bead retaining claws 26 being composed of an arcuate plates slightly smaller in inner diameter than the inner diameter of a bead 20. The two arcuate retaining claws 26 which form a pincers 97 can be brought towards each other to coincide their arcuate centers 101. But they do not meet and, when they are brought together, they do not form a circle which is complete; their arcs are long enough to provide bead retaining stability, typically each arc is about 90° to about 160°. Also, the two pincers 97 have their planes parallel and their arcuate centers line up on a single imaginary straight line perpendicular to the planes of both pincers 97 (the "pincers axis" 104). Pincer axis 104 (an imaginary line) perpendicularly intersects the imaginary extension of the central line of the rotary shaft 8.

Also, pincers 97 can be positioned so that the circular centers 101 and pincer axis 104 line up with the center of the shaft 10 when the center of rotary shaft 8 is as high as the center of the shaft 10 and the plane in which each pincer 97 lies is perpendicular to the floor face.

Two green tire retrieving pliers 99 are provided, each pliers 99 composed of two tire retrieving jaws 70, each jaw 70 rigidly mounted respectively on one of the arm bodies 24 centrally inward of the bead retaining claw 26 on that arm body, as by bolts, etc. (not shown in detail). Each tire retrieving jaw 70 of a pliers 99 is composed of an iron arcuate plate bent into an almost semicircular shape; about 5° to 10° of arc are left off the semi-circle at the arcuate plate ends so that when brought together so their arcuate centers coincide the two jaws 70 of a pliers will not bang together at the arc ends. Each green tire retrieving pliers 99 when closed has an almost circular inner surface slightly larger in its inner diameter than the outer diameter of a bead 20 (called "$D_{ob}$") yet being a good fit for the slightly larger outer diameter of the bead portion of the completed green tire after the building operation (hereafter "green tire bead region diameter" or "$D_{gb}$") for getting a good grip on the green tire. Hence the inner radius of each arcuate plate including one of the jaws 70 is about $\frac{1}{2} D_{gb}$ or slightly less to get a good grip on the green tire, and this is greater than $D_{ob}$ of a bead 20.

(I) Rotary Mechanism For Setter (Posture Controlling Means)

As shown in FIGS. 1 to 4, the setter 3 has a rotary shaft 8 rotatably secured to a table 31 by a bearing 30. On the end of shaft 8 opposite to arm bodies 24 are a rotary plate 32 with a plate pulley 33 secured to rotary shaft 8 by a key 34.

A motor 35 is mounted to a support plate 36 on table 31. A motor pulley 37 is mounted on motor 35 and is coupled by a belt 38 to the plate pulley 33. Rotary shaft 8 is thus adapted to rotate when driven by of motor 35. Note that rotary plate 32's rotation is directly coupled to rotate shaft 8.

A stopper 43 is disposed on the horizontally extended diameter rotary plate 32. A roller 44 is coupled to the tip end of stopper 43 and cylinder 45 is coupled through a pin 46 to the other end of the stopper. Guides 47 are provided on the sides of a stopper 43 so that the stopper 43 may radially hit against the edge of the rotary plate 32 through the operation of the cylinder 45. Guides 47 and cylinder 45 are secured to support plate 48, which is secured onto a table 31.

Rotary plate 32 is provided with four engagement grooves 39 each being provided at 90 degrees and four detection holes 40 are provided, which are shifted by 45 degrees respectively from the grooves. Rotary plate 32 and arm body 24 are arranged through rotary shaft 8 so that the arcuate bead gripping plate faces of the bead retaining claws 26 mounted on the arm body 24 may be positioned vertical with respect to the floor face when a line connecting the center of the engagement groove 39 with the center of the opposite engagement groove becomes vertical to the floor face. Of course the rotation of claws 26 also rotates green tire retrieving jaws 70. A photoelectric tube 41 and light source 103 is secured to table 31 to encompass a portion of the edge region of rotary plate 32 by a support plate 42, in a position where the detection holes 40 can be detected during rotation of plate 32.

When the rotation of plate 32 is started, cylinder 45 retreats to its restored position, and stopper 43 disengages from rotary plate 32. Then, motor 35 is selectively driven to rotate the rotary plate 32 (and hence the arm body 24) in a clockwise (FIG. 7) (normal) direction or anticlockwise (opposite-to-normal) direction, and the roller 44 is brought back in contact with the edge of plate 32 by moving stopper 43 towards plate 32.

At a fixed short interval after photoelectric tube 41 detects a hole 40 the motor 35 stops its driving operation, rotary plate 32 rotates only due to inertia, stopper 43 engages engagement groove 39, and plate 32 comes to a stop.

Accordingly, the planes of bead retaining pincers 97 and the green tube retrieving pliers 99 mounted on arm bodies 24 can be kept vertical or horizontal with respect to the floor face, and can accurately rotate by 90 degrees, and track 6 can move the pincers 97 and pliers 99 between two work stations, a bead pickup station associated with imaginary centerplane 105 and a former station associated with imaginary centerplane 106 (see FIG. 1). At the pickup station 105 the pincers 97 are positioned to horizontally line up their pincer axis 104 with the center of bead stocker 2's screw 13. When the pincers 97 and pliers 99 are at former station 106, the pincer axis 104 and a coincident pliers' axis are lined up with the axis of former shaft 10 if their planes are verticle to the floor.

(II) Lift Mechanism For Setter (Work Posture Controlling Means)

Figure 3:
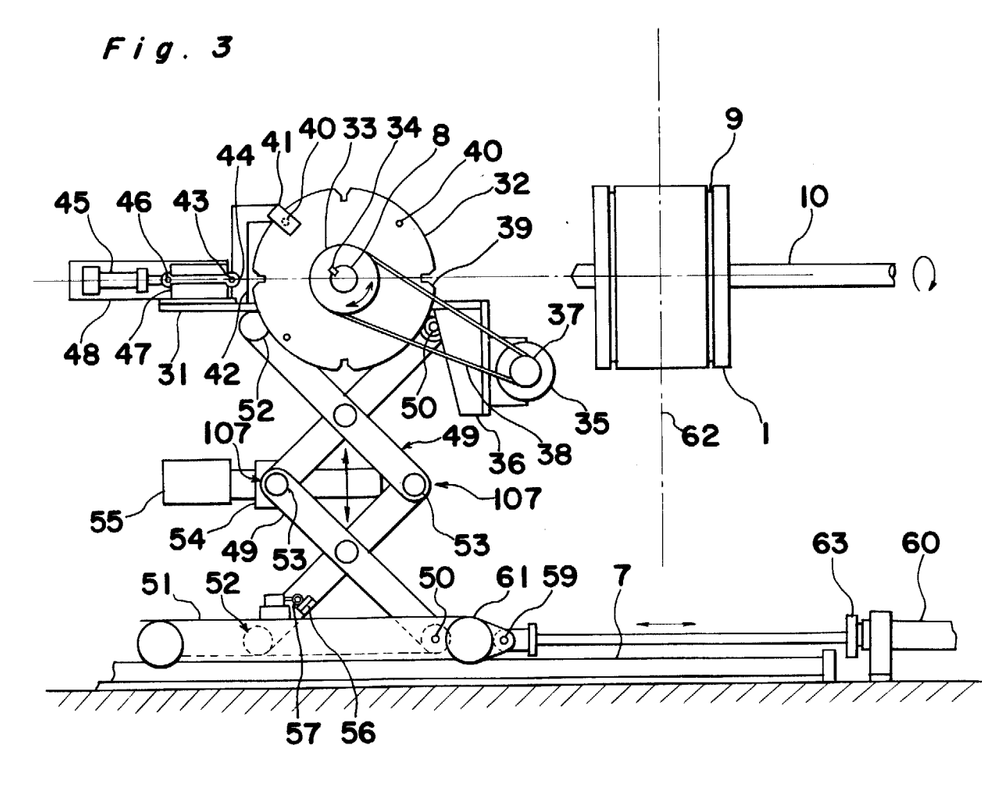
FIG. 3 is a front view of a table lifter portion and a truck portion.

As shown in FIGS. 1 to 4, positioned under the table 31 of bead setter 3 is an elevator or supporting equipment 49 for raising and lowering table 31, such as two sets of crossed, jointed legs. As can be seen in FIG. 3, one side of supporting equipment 49 is secured by pin 50 to table 31 and at the other ends to truck 51 by similar pin 50. The other side of the support equipment 49 is fitted with top and bottom rollers 52 which rotate respectively on the undersurface of the table 31 and in the bed of truck 51 permitting the vertical motion of the table 31. When this equipment is operated, rotary shaft 8 remains parallel to the floor and moves only in a vertical plane.

At the knees 107 of support equipment 49 are two pins 53 respectively coupling back and front knees 107 to a supporting metal fixture 54 and a piston rod (not shown) of a cylinder 55. The supporting metal fixture 54 supports the body of cylinder 55.

As the piston of cylinder 55 expands the space between pins 53, knees 107 are pushed further apart and the rotary shaft 8 makes a vertical descent, retaining its horizontal orientation. Conversely when the piston of cylinder 55 returns to its restored position, the knees 107 come together and rotary shaft 8 is made to rise. During ascent at pickup station 105, a metal kick fixture 56 secured at the lower end of supporting equipment 49 kicks a limit switch 57, mounted on truck 51, which stops the restoring operation of the piston of cylinder 55 so that the axis of rotary shaft 8 exactly matches the height of the axis of shaft 10 of former 1. During descent at the bead pickup station 105 as shown in FIG. 2, a limit switch 25 is placed at the bead setter to stop the operation of cylinder 55 when arm body 24 has been lowered to its bead pickup position where the under face of the bead retainer claws or bead retaining equipment 26 is located slightly above the top end of a stock pipe 21 of bead stocker 2.

A control program is provided so that the plane of the arm body 24 may be selectively turned horizontal with respect to the floor face for movement in the upward and downward operations at the pickup station 105.

From the above description, the bead setter can descend at the bead pickup station 105 with the circular center of one of the bead retaining pincers 97 facing the bead stocker 2 and aligned with the center of the stocker's screw 13 while maintaining the plane in which, it lies parallel to the floor (horizontal). Then, limit switch 25 at bead stocker 2 is kicked by arm body 24 to stop the downward motion of the setter 3 and pincer 97. According to the bead supply method (to be described later), only one bead 20 is concentrically collected and retained by the bead retaining pincer 97 facing the bead stocker 2 and thereafter support equipment 49's cylinder 55 is restored to cause ascent. Arm body 24 supporting pincers 97 makes a vertical ascent in its horizontal condition with the collected and retained bead 20 on the pincer 97 facing stocker 2. Setter 3 can ascend with the center of retained bead 20 being aligned with the center of the screw 13. By means of the limit switch 57 at the lower end of the supporting equipment 49 setter 3 stops its upward motion with the axis of rotary shaft 8 the same height as the axis of shaft 10.

Now shaft 8 is rotated 180° so that the remaining pincer 97 faces the stocker 2, and the lowering, collecting and retaining, and raising operations are repeated as before to collect and retain a second bead 20. Then another rotation, of 90°, will make the plane of the pincers 97 vertical with the floor in preparation for moving the beads over the former. Since the mutual circular centers of the two pincers 97 are concentric as described hereinabove, the two pincers 97 can each retain a bead 20, the two beads 20 being mutually parallel and their imaginary centers lying on pincer axis 97 which is perpendicular to their planes. For the setter rotary mechanism described above, the 180° rotation needed to reverse the pincers 97 can be, for example, comprised of two 90° reactions or and a method which counts two detection holes 40.

Figure 7:
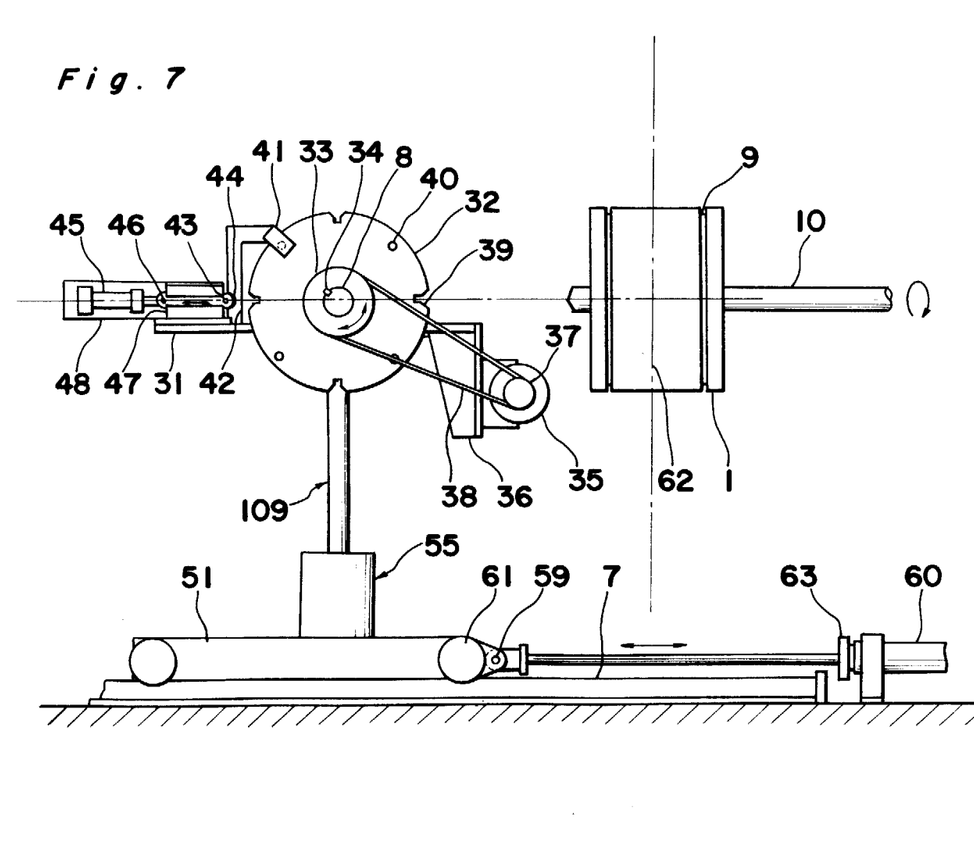
FIG. 7 is a front view showing a modified example of FIG. 3.

For ascent and descent the lift mechanism may use one or more simple elevating, large-sized cylinders 55 each of which has a piston 109 being attached as a support leg to table 31, as shown in FIG. 7, instead of the leg structure of FIG. 3.

(III) Bead Stocker

Figure 4:
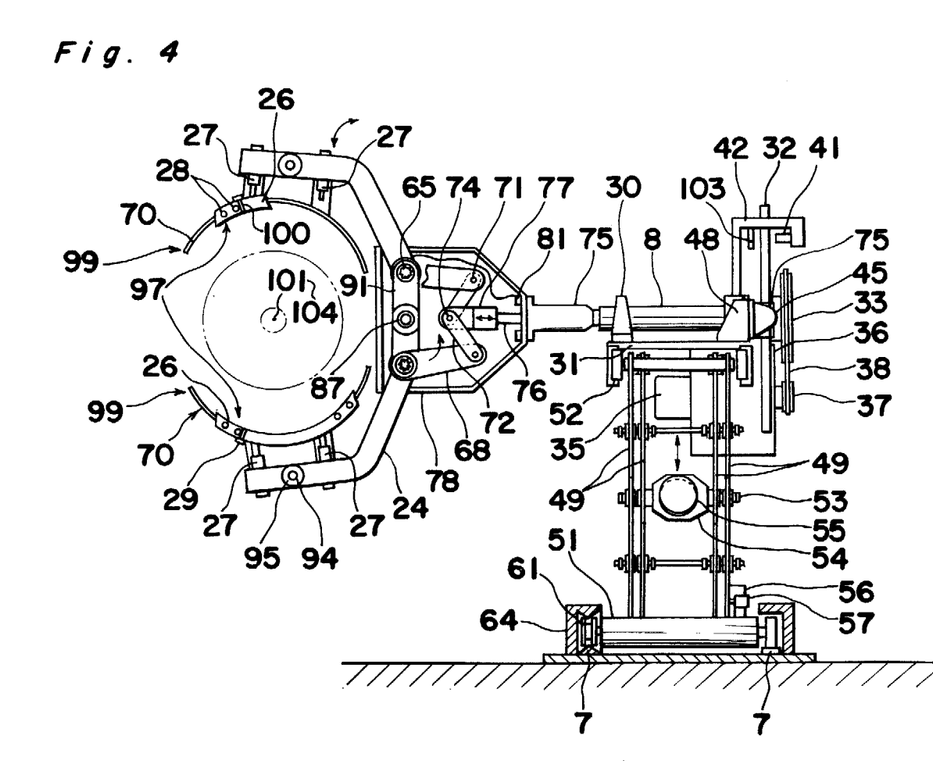
FIG. 4 is a side view showing a table lifter portion, a truck portion and a bead setter.green tire taking-out apparatus.

As shown in FIG. 1, FIG. 2 and FIG. 4, bead stocker 2 has a setter 11, as a driving source, to transmit the rotation to the screw 13 through a belt 12.

The screw 13 is secured to frame 16 so that it may become vertical to the floor face for pivotal motion by bearings 14 and 15. Female screws 17 are mounted around the screw 13. Female screw 17 is secured by the bolt 19 to a receiving plate 18. The receiving plate 18 is horizontal to the floor face.

A stock pipe of the bead 20 is mounted on the frame 16 concentrically with screw 13. The outer diameter of stock pipe 21 is slightly smaller than the inner diameter of the bead 20.

The stock pipe 21 is provided with a notch 22. Receiving plate 18 extends through the notch 22 and projects outside from the stock pipe 21. Also, notch 22 serves as a rotation stop of the female screw 17 during rotation of the screw 13, thus allowing the female screw 17 and the receiving plate 18 to rise or fall during the rotation of the screw 13.

When the bead 20 is inserted into the stock pipe 21, a manual button (not shown) reversely rotates motor 11 to downwardly move receiving plate 18 thereby to perform the inserting operation. When the receiving plate 18 kicks a limit switch 23, motor 11 is adapted to come to a stop.

The bead setter 3 with beads 20 being inserted into the stock pipe 21 descends with the circular center of the bead retaining equipment 26 being aligned with the center of the screw 13 by the above-described method. When the arm body 24 kicks limit switch 25, the setter 3 stops its downward motion.

Thereafter, motor 11 makes normal rotation. Receiving plate 18 rises with the beads 20 thereon.

To reduce the sliding resistance between beads 20 and stock pipe 21 and to prevent beads 20 from being adhered on each other, well known adhesion preventing powders are applied on the beads 20. Bead retaining claws or bead retaining equipment 26 as an adsorbing and retaining means is made of a circular plate whose inner diameter is several millimeters smaller than the inner diameter of the bead 20. Magnets 28 are buried in bead retaining claws so that beads 20 may come to the center of each of the magnet 28. Magnet 28 is made of an electromagnetic magnet or a permanent magnet. Since each of beads 20 has a steel cord therein, magnet 28 attracts one bead 20 as the bead approaches at a given distance. At this time, to prevent the centers of the flying beads 20 from being disengaged from the center of screw 13, the position of the limit switch 25 is adjusted so that the underface of the bead retaining equipment 26 may stop at a position slightly above the top end of the stock pipe 21.

Each of the bead retaining equipments 26 has a limit switch 29 mounted at one location (at two locations each having one unit). An adsorption detecting portion 100 is adapted to detect the adsorption of beads 20 by magnets 28. When limit switches 29 have operated at two locations, beads 20 are positively adsorbed by the bead retaining equipments 26. Motor 11 stops to cease the rising operation of receiving plate 18. The attraction force of the magnet is powerful enough to positively attract one bead 20 only, but cannot attract two beads at the same time. Thereafter, the setter 3 rises and reverses by 180 degress in its opposite direction by the above described method. The same operation is repeated.

Thus, the two beads 20 can be supplied to the setter 3 one by one in mutually parallel and concentric relation.

(IV) Horizontal Motion Mechanism (Translation Means or Motion Controlling Means) for Setter As shown in FIG. 1 to FIG. 5, two beads 20 are retained, by the bead retaining claws or bead retaining equipment 26, one by one in mutually parallel and concentric relation by the above-described method. When the center of rotary shaft 8 has climbed as high as the center of shaft 10 with the center of bead 20 being aligned with the center of the screw 13, each of beads 20 becomes horizontal to the floor face and is equal in space from the center line of the rotary shaft 8.

When arm body 24 is rotated by 90 degrees in a normal direction by the above-described rotating method (a line connecting the center of bead 20 with the center of the bead vertically crosses the central line of rotary shaft 8 and the center of the screw 13 is located on the extending line of the center of the shaft 10), the center of the bead 20 can be aligned with the center of shaft 10.

When cylinder 60 is returned to its restoring position under this condition, truck 51 which is provided with wheels 61 and is connected with cylinder 60 by a pin 59 moves on the rail 7 towards the former 1, in parallel and smoothly, around shaft 10 (because the rail 7 is installed in parallel to the center of shaft 10).

Accordingly, two beads 20 can move one by one in mutually parallel relation and towards the former 1 with the center being along the central line of shaft 10. Since the center of screw 13 of the bead stocker 2 is located on the extending line of the center of shaft 10 and is arranged in a position, which is the stroke length of the cylinder 60 from the central position 62 of the former 1, the central line of the rotary shaft 8 aligns with the former central position 62 in the restoring condition of the cylinder 60. Bead 20 is equal in both-side distance from the former central position 62 and is vertical around shaft 10. At this time, the former 1 is deflated. The rubber-coated cloth is pasted on the outer periphery thereof, symmetrical to the former central position or plane 62. As the outer periphery thereof is smaller than the inner diameter of bead retaining equipment 26, bead 20 can pass, without hindrance, outside the outer periphery of the former 1.

A former 1 is expanded with the bead space being pre-set to the space of groove 9 of the former 1 by a method described later so that bead 20 is fixed into groove 9 and is secured to the rubber-coated cloth (not shown). A spring (not shown) is incorporated inside supporting equipment 27 which supports bead retaining equipment 26. During the expanding operation of the former 1, the inner side of the bead retaining equipment 26 is depressed by the rubber-coated cloth (not shown) so that bead retaining equipment 26 is adapted to escape in a vertical direction.

The two beads can be correctly secured, in mutually parallel relation, on the rubber-coated cloth pasted, on the former 1, with the center of the space of of bead 20 being aligned with the central position 62 of the former.

Also, a limit switch (not shown) for detecting the completion of the reciprocating operation of cylinder 60 is mounted on frame 64 of rail 7. A kick metal fixture (not shown) therefor is mounted on a truck 51. The tip end of cylinder 60 is threaded and is provided with a stopper 63, which is adapted to adjust so that the center of rotary shaft 8 may correctly align with the central position 62 of former 1 during the restoring operation of cylinder 60.

Thus, the operation of cylinder 60 detects the alignment of the rotary shaft center of setter 3 with the screw center of the bead supply apparatus 2 to stop the operation of cylinder 60. Also, the restoring operation of cylinder 60 detects the alignment of the rotary shaft center of setter 3 with the central position of the former 1 to stop the restoration of cylinder 60.

(V) Opening and Shutting Mechanisn for Setter (Tire Retaining Means)

After bead 20 has been secured on the rubber-coated cloth by a method explained in the above-described horizontal motion mechanism, setter 3 is required to shunt to continue the molding operation of the green tire. The method will be described hereinafter.

Figure 5:
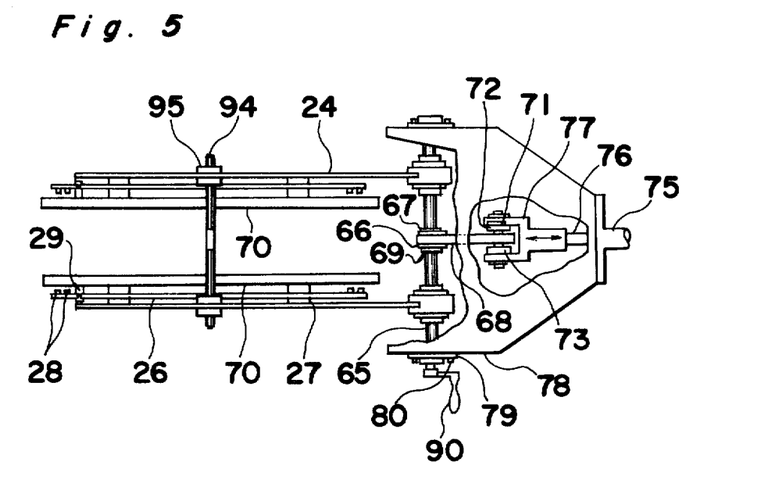
FIG. 5 is a detailed plan view of the bead setter.green tire taking-out apparatus.
Figure 6:
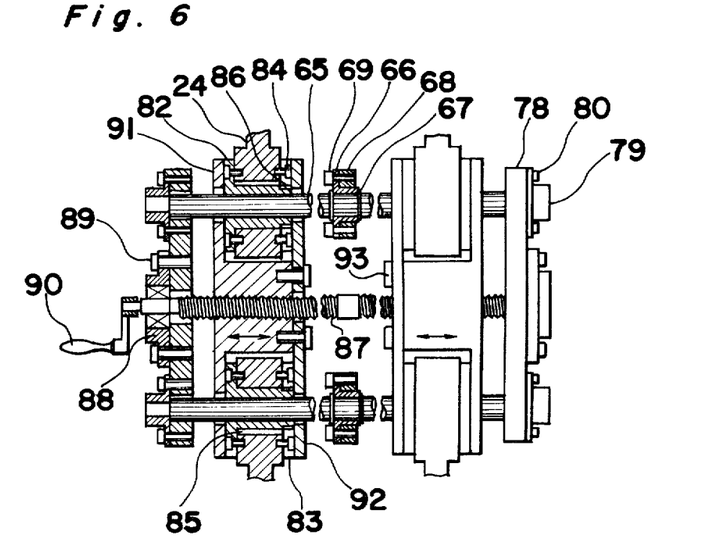
FIG. 6 is a detailed front view of the operation mechanism.

As shown in FIG. 4 to FIG. 6, arm body 24 is vertically coupled to a spline shaft 65 by flange 82, screw 86, holding plate 83, bolt 84 and key 85. Arm body 24 can be opened or shut through the rotation of spline shaft 65. Spline shaft 65 is rotatably secured at its both ends to a main frame 78 by a bearing 79 and a bolt 80.

A boss 66 which aligns with the shape of spline shaft 65 is secured, by a snap ring 67, to the central position of spline shaft 65. A transmitting equipment 68 is secured to boss 66 by a bolt 69. Transmitting equipment 68 is coupled to a transmitting equipment 72 by a pin 71. A snap ring 73 prevents transmitting equipment 68 from being disengaged from the transmitting equipment 72. Transmitting equipment 72 is coupled to a retaining metal fixture 77 at the tip end of rod 76 of cylinder 75.

Cylinder 75 is buried in rotary shaft 8. Also, a main frame 78 for supporting arm body 24 and the entire opening and shutting mechanism is secured so that a line connecting the center of two spline shafts 65 secured to cylinder 75 by a bolt 81 may fall on the vertical line of the central line of rotary shaft 8. The center of two spline shafts 65 is arranged to become equal in distance from the central line of the rotary shaft 8.

Due to the above description, spline shaft 65 is horizontal to the floor face when rotary shaft 8 is located in such a condition as described in FIG. 4 through the rotary mechanism.

When cylinder 75 operates due to the above description, the transmitting equipment 72 rotates towards rotary shaft 8 with pin 74 as a supporting point as shown in FIG. 4 and accordingly transmitting equipment 68 rotates (FIG. 4→direction) towards rotary shaft 8 with spline shaft 65 as a supporting point. As spline shaft 65 rotates in the same direction, arm body 24 vertically opens with respect to the floor face. When cylinder 75 is restored, spline shaft 65 rotates in the opposite direction to close arm body 24. Following the opening or shutting operation of the arm body 24, bead retaining equipment 26 and the green tire retrieving jaws or green tire retaining equipment 70 can open or shut vertically with respect to the floor face.

After bead 20 has been secured on the rubber-coated cloth pasted on the former 1, arm body 24 opens by the above-described method. Setter 3 with arm body 24 being open moves to the position of the bead supply apparatus 2 by the above-described horizontal motion mechanism. Thus, the setter 3 can shunt.

(VI) Adjusting Mechanism for Bead Space

As shown in FIG. 4 to FIG. 6, a feed screw 87 is rotatably mounted on main frame 78 with a flange unit 88 and a bolt 89. A handle 90 is mounted for easier rotation on one end of feed screw 87.

The central position of feed screw 87 is arranged to vertically cross the central line of rotary shaft 8. The center of the feed screw 87 is mounted to become parallel to spline shaft 65. Feed screw 87 is symmetrically provided from the central position. Slide frames 91 are disposed at equal intervals from the central position. Slide frame 91 embraces flange 82 secured to the arm body 24 with the support plates 92 and bolt 93.

Arm body 24 can open or narrow to an optional interval bisymmetrically from the central line of the rotary shaft 8 through the rotation of the handle 90. Also, slide frame 91 and support plate 92 are bolt holes at the position of spline shaft 65 so that they may not affect the rotation of spline shaft 65. During the rotation of spline shaft 65, flange 82 and holding plate 83 slides, respectively, with slide frame 91 and the support plate 92.

A stay bolt 94 and a lock nut 95 are mounted in the arm body to positively retain the interval after the interval adjustment. Lock nut 95 is loosened before the interval adjustment. After the interval adjustment, stay bolt 94 is secured with lock nut 95 to the interval.

Bead retaining equipment 26 (which follows the arm body 24) is adjustable to an optional interval symmetrically from the center of rotary shaft 8. The interval can be set in advance so that bead 20 may fit to the interval of the groove 9 of the former.

(VII) Mechanism for Taking-Out Green Tire (Motion Controlling Means)

As shown in FIG. 1 to FIG. 6, setter 3 shunts by a method described in the paragraph of the opening and shutting mechanism for setter. Thereafter, the green tire molding operation continues. At the completion of the molding operation, the shunted setter 3 aligns the center of rotary shaft 8 with the central position 62 of former 1, with arm body 24 being open, by the above-described horizontal motion mechanism and comes to a stop. Then, arm body 24 vertically closes with respect to the floor face by the setter opening and shutting mechanism. The green tire retaining equipment 70 retains, along the outer periphery of the green tire, the location slightly closer to the central position 62 of the former 1 than to the bead portion of the green tire (not shown). The green tire retrieving jaws or retaining equipment 70 are mounted on the arm bodies 24 by supports or supporting equipment 27 and arranged on both inner sides of bead retaining equipment 26 to have a circular arc equal to the outer diameter of the bead portion of the green tire.

Under the above-described condition, the circular center of green tire retaining equipment 70 aligns with the center of shaft 10. Also, the bead retaining equipment 26 depresses the bead portion of the green tire. It is adapted to escape by a spring (not shown) incorporated in the supporting equipment 27. Under this condition, former 1 is deflated, whereby the setter horizontal motion mechanism allows the green tire to be taken out from former 1, with the green tire separated from former 1 being retained.

After the green tire taking-out operation has been completed, arm body 24 is opened by the opening and shutting mechanism. The green tire is transferred to a conveying means (for example, operator, conveyor hook or the like). Thereafter, arm body 24 is closed by the opening and shutting operation. At the time point, arm body 24 is still vertical to the floor face and the central line of rotary shaft 8 is located on the vertical line of the center of screw 13 of bead supply apparatus 2. Then, the rotary mechanism rotates arm body 24 by 90 degrees in its normal direction to complete one cycle. Since the rotation is 180 degrees in both normal and reverse directions, the piping and wiring of setter 3 is not pulled off.

The operating order of the bead supply apparatus of such character as described hereinabove will be described hereinafter.

(1) Setter 3 is located at a climb position in the position of the bead stocker 2. Arm body 24 is horizontal to the floor face.

(2) Bead retaining equipment 26 stops at a position slightly above the stock pipe 21 by a descending mechanism.

(3) Motor 11 of bead stocker 2 is driven and receiving plate 18 with beads 20 thereon climbs until one bead 20 is magnetically collected by bead retaining equipment 26.

(4) Setter 3 with one bead 20 retained thereon climbs by an ascending mechanism.

(5) Arm body 24 reverses by 180 degrees by the rotary mechanism.

(6) Paragraphs (2) to (4) are repeated.

(7) Arm body 24 rotates by 90 degrees in its normal direction by the rotary mechanism and becomes vertical to the floor face thereby to align the bead center with the center of former shaft 10.

(8) The imaginary midplane between two retained beads 20 is aligned with the central position of the former 1 through the rubber-coated cloth affixed to or pasted on the reduced former 1 by the horizontal motion mechanism.

(9) Former 1 is expanded to secure beads 20 to the rubber-coated cloth.

(10) Arm body 24 opens by the opening and closing mechanism.

(11) Setter 3 shunts to the bead pickup station bead stocker position 105 by the horizontal motion mechanism.

(12) Setter 3 returns to the tire station or central position 106 of the former by the horizontal motion mechanism.

(13) Arm body 24 is closed by the opening and shutting mechanism to retain the green tire by green tire retaining equipment 70.

(14) Former 1 is reduced in diameter or deflated to separate the green tire from former 1.

(15) Setter 3 takes out the green tire to the position of the bead stocker 2, by the horizontal motion mechanism, with the green tire being horizontal.

(16) The opening and shutting mechanism opens arm body 24 (The green tire is transferred to a storage of conveying means).

(17) The opening and shutting mechanism closes arm body 24.

(18) The rotary mechanism rotates arm body 24 by 90 degrees in its normal direction.

And one tire building cycle is completed.

As apparent from the above description, the present invention provides the setter with a bead retaining means, a posture controlling means and a motion controlling means. After two beads of the bead stocker have been concentrically collected and retained, the posture controlling operation is effected to align the center of the bead with the center of the former shaft. The motion controlling operation is effected so that the simultaneous inserting operation may be performed, concentrically and to align the two-bead interval with the former center, to both side-portions of the tire inner layers. As the rubber-coated cloth is not held down, as conventionally, with an automatic "finger", the variation in bead interval and rubber-coated cloth amount rolled up is reduced, thus resulting in stable quality.

Also, since the bead supply and the positional alignment with the tire building former are automatically performed, the manual handling of the beads is not required, so the worker's burden is reduced and productivity improved.

In addition, according to a second invention associated with the present invention, the taking-out operation of the green tire can be automated, the worker's burden is reduced and the productivity is improved, since after the green tire has been retained by the tire retaining means after the completion of the green tire molding operation, the green tire is adapted to be concentrically pulled out from the tire molding former due to the motion of the bead setter. In addition, stable quality is ensured, since the green tire is not scraped against the tire building former 1 during the pulling-out operation.

Although the present invention has been described and illustrated in detail, it is to be clearly understood that the same is by way of illustration, the spirit and scope of the present invention being limited only by the terms of the appended claims.

What is claimed is:

1. A bead manipulator adapted for use with a tire building former having a cylindrical construction including a central axis and a diameter selectively expandable or contractible and a bead stocker being arranged apart from the tire building former and including a stock pipe for stocking a plurality of beads concentrically and collectively inserted therein and a bead moving mechanism for moving beads stocked along the stock pipe, said stock pipe being positioned wherein a central axis thereof is perpendicular to a plane which includes said central axis of the tire building former comprising:

a bead setter for positioning each of a pair of beads to a predetermined position on the cylindrical structure of the tire building former;

a rotatable shaft including a central axis perpendicular to the plane which includes both central axes of the tire building former and of the stock pipe;

a pair of bead retaining means being supported from said rotatable shaft and being symmetrically disposed with respect to a plane passing through the central axis of the rotatable shaft, said bead retaining means being adapted to hold a pair of beads supplied one by one from the bead stocker and said pair of beads being parallel to each other and at a predetermined distance;

a posture controlling means for controlling the posture of the bead retaining means through rotating the rotatable shaft around the central axis thereof;

a lift mechanism for moving the retaining means up and down including a supporter for the rotatable shaft and a drive means for lifting the supporter relative to the bead stocker or the tire building former; and a transfer means for transferring the bead setter between the bead stocker and the tire building former along a rail being parallel to the extension of the central axis of the tire building former.

2. A bead manipulator according to claim 1, wherein said cylindrical structure of the tire building former includes a pair of grooves for positioning a pair of beads.

3. A bead manipulator according to claim 1, wherein said stock pipe includes a plurality of notches extending parallel to the central axis thereof.

4. A bead manipulator according to claim 3, wherein said bead moving mechanism includes a screw shaft extending through the stock pipe concentrically and being driven by a driving source through a transmission means, a female screw being engaged into the screw shaft and a receiving plate being secured to the female screw at the center portion thereof and having a plurality of arms extending radially from the center portion and protruding through the notches of the stock pipe outwardly, whereby said receiving plate is moved without rotation when the screw shaft is driven.

5. A bead manipulator according to claim 1, wherein said bead setter further comprises a green tire retaining means for grasping a green tire on the tire building former.

6. A bead manipulator according to claim 1 or 5, wherein each of said pair of bead retaining means includes a pair of arm bodies being mounted to one end of the rotatable shaft symmetrically pivotable to each other with respect to the extension of the center axis of the rotatable shaft, bead retaining claws supported by the arm bodies, and a drive mechanism for driving the pair of arm bodies to grasp or release the bead positioned on said bead retaining claws.

7. A bead manipulator according to claim 6, wherein each of said bead retaining claws included bead attracting means for retaining a bead on each of the claws.

8. A bead manipulator according to claim 7, wherein said bead retaining claws include a flat side and the attracting means is adapted to retain the bead against the flat side.

9. A bead manipulator according to claim 6, wherein said bead retaining claw is supported through a resilient means to the arm body.

10. A bead manipulator according to claim 5, wherein said green tire retaining means comprises a jaw supporting means for firmly supporting an arcuate green tire retriever jaw on the arm body parallel with the bead retainer claws.

11. A bead manipulator according to claim 1, wherein said posture controlling means of the bead setter further comprises stopper means for holding the bead retaining means selectively in a posture perpendicular to the central axis of the bead stocker or in a posture perpendicular to the central axis of the tire building former.

* * * * *